United States Patent
Wehrle et al.

(10) Patent No.: US 9,749,778 B2
(45) Date of Patent: Aug. 29, 2017

(54) DATA COMMUNICATION DEVICE AND METHOD FOR DATA COMMUNICATION

(71) Applicant: Aesculap AG, Tuttlingen (DE)

(72) Inventors: Christian Wehrle, Engen (DE); Andreas Göggelmann, Ingersheim (DE)

(73) Assignee: AESCULAP AG (DE)

(*) Notice: Subject to any disclaimer, the term of this patent is extended or adjusted under 35 U.S.C. 154(b) by 0 days.

(21) Appl. No.: 15/115,761

(22) PCT Filed: Feb. 5, 2015

(86) PCT No.: PCT/EP2015/052366
§ 371 (c)(1),
(2) Date: Aug. 1, 2016

(87) PCT Pub. No.: WO2015/118047
PCT Pub. Date: Aug. 13, 2015

(65) Prior Publication Data
US 2017/0013395 A1    Jan. 12, 2017

(30) Foreign Application Priority Data
Feb. 7, 2014 (DE) .................. 10 2014 101 526

(51) Int. Cl.
*H04B 7/00* (2006.01)
*H04W 4/00* (2009.01)
(Continued)

(52) U.S. Cl.
CPC ......... *H04W 4/008* (2013.01); *H04L 63/1458* (2013.01); *H04L 63/18* (2013.01);
(Continued)

(58) Field of Classification Search
CPC ............. H04W 4/008; H04W 52/0235; H04W 76/021; H04L 63/1458
(Continued)

(56) References Cited

U.S. PATENT DOCUMENTS

2005/0059354 A1    3/2005 Zhao
2008/0167088 A1    7/2008 Rabu
(Continued)

FOREIGN PATENT DOCUMENTS

WO    2013098262    7/2013
WO    2013100994    7/2013

OTHER PUBLICATIONS

German Search Report for German Application No. 10 2014 101 526.6, dated Oct. 6, 2014, 10 pages.
(Continued)

*Primary Examiner* — Eugene Yun
(74) *Attorney, Agent, or Firm* — RatnerPrestia (57) ABSTRACT

A data communication device includes: a computation unit and data unit which includes a first radio communication module for wireless data exchange with an external radio device or is connected to the first radio communication module, a second radio communication module which communicates wirelessly with the external radio device, and a memory that stores identification data from the first radio communication module. The first radio communication module is operated in a receiving mode in which the first radio communication module is not detectable by the external radio device. Upon receiving identification data for the first radio communication module from the external radio device, the first radio communication module can establish a connection and for subsequent data exchange with the external radio device. The second radio communication module is operated in standby mode in which the second radio communication module waits for a communication query from the external radio device.

18 Claims, 5 Drawing Sheets

(51) Int. Cl.
*H04L 29/06* (2006.01)
*H04W 12/06* (2009.01)
*H04W 52/02* (2009.01)
*H04W 76/02* (2009.01)

(52) U.S. Cl.
CPC ....... *H04W 12/06* (2013.01); *H04W 52/0235* (2013.01); *H04W 76/021* (2013.01); *H04L 2463/141* (2013.01); *Y02B 60/50* (2013.01)

(58) Field of Classification Search
USPC ...................................................... 455/41.2
See application file for complete search history.

(56) References Cited

U.S. PATENT DOCUMENTS

| 2011/0210830 | A1 | 9/2011 | Talty |
| 2012/0007712 | A1 | 1/2012 | Tung |
| 2012/0052806 | A1 | 3/2012 | Takayama |
| 2012/0195387 | A1 | 8/2012 | Masuda |
| 2012/0213136 | A1 | 8/2012 | Woo |

OTHER PUBLICATIONS

International Search Report and Written Opinion of the International Searching Authority for International Application No. PCT/EP2015/052366, dated Apr. 10, 2015, 8 pages.

DATA COMMUNICATION DEVICE AND METHOD FOR DATA COMMUNICATION

RELATED APPLICATIONS

This application is the United States National Phase entry of International Application No. PCT/EP2015/052366, filed Feb. 5, 2015, which is related to and claims the benefit of priority of German Application No. DE 10 2014 101 526.6, filed Feb. 7, 2014. The contents of International Application No. PCT/EP2015/052366 and German Application No. DE 10 2014 101 526.6 are incorporated by reference herein in their entireties.

FIELD

The present invention relates to a data communication device and a method for data communication.

BACKGROUND

There are radio modules which communicate with one another by radio, i.e. in wireless manner. So that the radio modules are able to communicate with each other, the respective address of the other radio module must be known or must be detectable by radio.

For safety reasons, for instance for offering protection against attacks per DoS (Denial of Service), the radio modules—at least for most of the time—should be "invisible" or not detectable for other radio modules with which a communication is not desired.

This can be solved in that the address of the communication partner is already known, because it is stored for instance in the radio module which desires to communicate with the communication partner. This, however, is not feasible if the modules (frequently) or units in which they are installed have to be replaced or if a pool made up of many modules or units is used and the communication partner from the pool is not known in advance.

Another solution is to "uncover" a module or unit, for instance by pressing a button on the respective module or unit (e.g. activating a "visibility" mode). This is cumbersome, as it requires a corresponding action by a user. What is more, this generates additional costs for corresponding external switches.

Especially in case of units which are spatially separated and/or firmly mounted (e.g. ceiling installation), so that the user does not have any possibility of intervention, there is no possibility that these modules which are unknown to each other enter into a communication connection.

There are various known radio techniques with differing properties in terms of data throughput, data transmission rate, range, frequency, channels etc. These techniques include, but not exclusively, Z-Wave, battery-less radio sensory systems by EnOcean, Zigbee, Bluetooth, WiFi (802.11a, 802.11b, etc.), WUSB (wireless USB), WHDI (SRI) as well as WiHD (wireless HDMI) and proprietary solutions. In the field of medical engineering, for instance, specific radio standards have established themselves, including in particular Bluetooth, Zigbee and WiFi.

"Bluetooth" is generally subdivided in "Classic" and "Low Energy". "Classic" relates to the original protocols Bluetooth 3.0, Bluetooth 2.1 . . . , whose modules or chips are also referred to as classic module. Since Bluetooth 4.0 there is also the option of "Low Energy" (additional protocol stack to "Classic") which allows an energy-saving mode of operation in an economical way due to a quick establishment of the connection. However, relevant Bluetooth-based low-energy modules only achieve a lower data transmission rate and a lower data throughput. All Bluetooth-4.0 modules which are available on the market are based solely on the classic protocol or solely on the low-energy protocol, so-called single-mode modules, or are based on both protocols, so-called dual-mode modules which allow to switch over between the classic mode and the low-energy mode. However, even such a dual-mode module has a higher energy consumption than a single-mode module in the activated state before the establishment of a connection, as the energy consumption prior to the establishment of a connection is determined by the classic mode.

In accordance with the Bluetooth protocol, there is e.g. the "discoverable" mode in which the module looks for other Bluetooth modules and is receptive to requests from other Bluetooth modules. Further, there is the "connectable" mode in which the module, if it is addressed with its address, is ready for entering into a connection, but itself cannot be detected by other modules.

A low-energy module has the special characteristic that it can establish and maintain only one connection to another (low-energy) module at a time.

There are some orthopedic units which are supplied with voltage by a battery or an accumulator and perform their communication per radio.

In addition, an orthopedic navigation system is known which serves the physician as a smart tool with joint-surgical interventions such as e.g. for the patient-specific positioning of implants in the field of endoprosthetics. In this context, the position of infrared light sources (passive, infrared light reflecting transmitters) which are attached for instance to the body of the patient, are intraoperatively detected in space by means of a video-optical camera system. It is possible to calculate the location and the position of the infrared light reflecting transmitters relative to one another and also the location and position of the surgical instruments relative to the patient. The measured values are computed with further data (for example with pre-operative planning data) and are supportive in placing and positioning the implant. Moreover, the individual implant components can be matched with each other in order to ensure the durability and function of the implant by optimum alignment.

However, if it should happen that during a surgical procedure the camera has to communicate with the computation/display device in wireless fashion by radio, a higher data throughput (and a higher data rate) is frequently required for each radio path, exceeding 500 kbit/s, for example. Thus, there is the need to employ radio techniques which usually do not only offer a higher data rate, but also have a higher power consumption. The power consumption during use, however, is not necessarily the greatest problem; rather, the problem is the standby current during the time in which a unit or the corresponding radio module is on standby for entering into a connection or is waiting for a connection request. This has an influence on the service life of the battery-powered or accumulator-powered units if these are to be always ready for entering into a connection.

SUMMARY

It is the object of the present invention to create a data communication device and a method for data communication which exhibit a high safety against attacks via e.g. DoS and offer a high data transmission rate.

According to the invention, a data communication device is created which comprises: a computation unit and data unit which comprises a first radio communication module for wireless data exchange with an external radio device or is connected to the first radio communication module, a second radio communication module which communicates wirelessly with the external radio device, and a memory that stores identification data of the first radio communication module, wherein the first radio communication module is operated in a receiving mode in which it is not detectable by the external radio device, but upon receiving its identification data from the external radio device is ready to establish a connection and ready for a subsequent data exchange with the external radio device, the second radio communication module is operated in a standby mode in which it waits for a communication query from the external radio device, when the second radio communication module receives a communication query from the external radio device, the second radio communication module reads the identification data of the first radio communication module from the memory after the establishment of a radio communication connection to the external radio device and sends said identification data to the external radio device.

It is preferred that the first radio communication module is a Bluetooth-based communication module, for instance a Bluetooth classic module or a Bluetooth dual-mode module.

Further preferred, the second radio communication module is a Bluetooth-based communication module, for instance a Bluetooth low-energy module (BLE-module), or also a Bluetooth single-mode low-energy module.

If the first and/or second radio communication module is a Bluetooth-based communication module, the external radio device correspondingly may also comprise a corresponding Bluetooth-based communication module for the Bluetooth-supported communication with the first/second radio communication module.

The second radio communication module can establish, for example, only one communication connection to an external radio device at a time. This prevents other radio devices from disturbing the radio communications both with the second radio communication module and the first radio communication module. Thus, the other radio devices do not come to know the identification data of the first radio communication module and hence cannot communicate with the first radio communication module, as also the first radio communication module does not reveal itself.

The data communication device may also include: a supply voltage input, a switch-on unit which is coupled to the supply voltage input and comprises a voltage output connected to the computation unit and data unit, wherein the switch-on unit comprises the second radio communication module, when the second radio communication module receives a communication query from the external radio device, the second radio communication module causes the switch-on unit to deliver a supply voltage to the computation unit and data unit via the voltage output in order to activate the computation unit and data unit and to activate the first radio communication module and switch it to the receiving mode, and wherein, when the data exchange with the external radio device is completed, the second radio communication module changes to the standby mode.

Upon completion of the data exchange, the first radio communication module likewise may enter into an inactive state or again change to the receiving mode.

The first radio communication module may have, for instance, a higher data transmission rate and in the standby mode a higher energy consumption than the second radio communication module. Here, the standby mode preferably relates to the state of being ready for entering into a radio connection. It is also sufficient, however, if the first radio communication module has a higher data transmission rate and/or a higher data throughput than the second radio communication module, without the level of the energy consumption by comparison of the two radio communication modules playing a roll.

By way of example, the data transmission rate of the first radio communication module amounts to at least 200 kbit/s, further preferred at least 250 kbit/s. Further preferred, the data transmission rate of the first radio communication module is higher than 1 Mbit/s. Yet further preferred, the transmission rate of the first radio communication module is more than 1.5 Mbit/s. The data throughput of the first radio communication module amounts to at least 100 kbit/s, for example. The energy consumption of the second radio communication module in the standby mode is less than 20 µA, for example.

A voltage supply unit may be connected between the supply voltage input and the switch-on unit, and the voltage supply unit may comprise a chargeable accumulator.

The data communication device may instead comprise a battery by means of which the switch-on unit is supplied with a battery voltage which serves as a power supply for the second radio communication module, wherein the switch-on unit may comprise a voltage switching unit which is coupled to both the second radio communication module and the supply voltage input and supplies the computation unit and data unit with the supply voltage via the voltage output upon receiving a corresponding signal from the second radio communication module and interrupts the supply of the supply voltage upon reception of a corresponding signal from the second radio communication module.

The computation unit and data unit may comprise a camera collecting image data, and said image data may be transmitted via the first radio communication module to the external radio device either in unprocessed form or in a form when having been processed by the computation unit and data unit. The camera may be designed, for instance, as a camera to be used in orthopedics, especially as a camera of an orthopedic navigation system, and in particular as a camera for being used during a surgical procedure. Said camera is able to emit infrared light and to detect the light which is reflected by corresponding reflecting transmitters and to convert it into signals for being forwarded to e.g. the computation unit and data unit (or is able to process such signals). It is also possible, however, that other light beams are captured by the camera and forwarded to the computation unit and data unit for further processing and displaying them. Thus, the image data relate to signals of any form which can be detected or captured by the camera and can be transferred by radio to the external radio device in unprocessed or processed form.

When the data exchange is completed, the second radio communication module may cause the switch-on unit to interrupt the delivery of the supply voltage via the voltage output to the computation unit and data unit.

Furthermore, the switch-on unit and the computation unit and data unit may be connected to each other by a signal line via which the second radio communication module sends a switch-on signal to the computation unit and data unit for activating the computation unit and data unit after the expiration of a predetermined first time period upon feeding the supply voltage from the switch-on unit to the computation unit and data unit. This ensures that the computation unit and data unit is capable of receiving and processing the switch-on signal.

Furthermore, the second radio communication module may send a switch-off signal via the signal line to the computation unit and data unit for deactivating the computation unit and data unit, before the switch-on unit, after the expiration of a predetermined second time period, interrupts the delivery of the supply voltage via the voltage output to the computation unit and data unit. This allows to shut down the computation unit and data unit in safe fashion, before the current supply is finally cut off.

The data unit and computation unit may be connected to the switch-on unit via a further signal line via which the computation unit and data unit can forward a system status to the switch-on unit. Said system status may be a termination of the data exchange between the first radio communication module or the data unit and computation unit and the external radio device. Upon reception of the system status, the second radio communication module may interrupt the connection to the external radio device and change to the standby mode. Moreover, the second radio communication module may then initiate the shut-down of the computation unit and data unit and/or the interruption of the delivery of the supply voltage to the computation unit and data unit.

The termination of the data exchange may be communicated to the second radio communication module, but also (or instead) signaled via radio by the first radio communication module.

According to the invention, also a method for data communication is created, comprising: operating a second radio communication module in a standby mode in which it waits for a communication query from a radio device, when the second radio communication module has received a communication query from the radio device, building up a radio communication connection between the second radio communication module and the radio device, and reading out identification data of the first radio communication module from a memory by the second radio communication module, and sending the identification data from the second radio communication module to the radio device, operating a first radio communication module in a receiving mode in which it is not detectable by the radio device, but upon receiving its identification data from the radio device, is ready for establishing a connection and for a subsequent wireless data exchange with the radio device.

The first radio communication module may communicate by means of Bluetooth, for instance a Bluetooth classic protocol.

The second radio communication module may communicate by means of Bluetooth, for instance a Bluetooth low-energy protocol.

The first radio communication module comprises, for instance, a higher data transmission rate and/or a higher data throughput and in the standby mode a higher energy consumption than the second radio communication module. In this respect, it is referred to the above-mentioned numbers regarding the data transmission rate, the data throughput and the energy consumption.

The second radio communication module, for instance, can establish only one communication connection to an external radio device at a time.

The method for data communication may also include: when the second radio communication module receives a communication query from the external radio device, the second radio communication module brings about that a computation unit and data unit is fed with a supply voltage by a switch-on unit in order to activate the computation unit and data unit and to activate the first radio communication module and switch it to the receiving mode, building up a radio communication connection between the first radio communication module and the radio device and then exchanging data between the first radio communication module and the radio device, and when the data exchange is completed, switching the second radio communication module to the standby mode.

The second radio communication module, for instance, may establish only one communication connection to an external radio device at a time.

The switch-on unit may be fed with an input voltage by a voltage supply unit, and the voltage supply unit may comprise a chargeable accumulator.

When the data exchange is completed, the second radio communication module may bring about that the switch-on unit interrupts the delivery of the supply voltage to the computation unit and data unit.

A switch-on signal may be sent from the second radio communication module to the computation unit and data unit for activating the computation unit and data unit after the expiration of a predetermined first time period upon feeding the supply voltage from the switch-on unit to the computation unit and data unit.

Furthermore, a switch-off signal may be sent from the second radio communication module to the computation unit and data unit for deactivating the computation unit and data unit, before the delivery of the supply voltage from the switch-on unit to the computation unit and data unit is interrupted after the expiration of a predetermined second time period.

BRIEF DESCRIPTION OF THE DRAWING FIGURES

Preferred embodiments of the present invention are described below with reference to the associated drawings in which.

DETAILED DESCRIPTION

Figure 2:
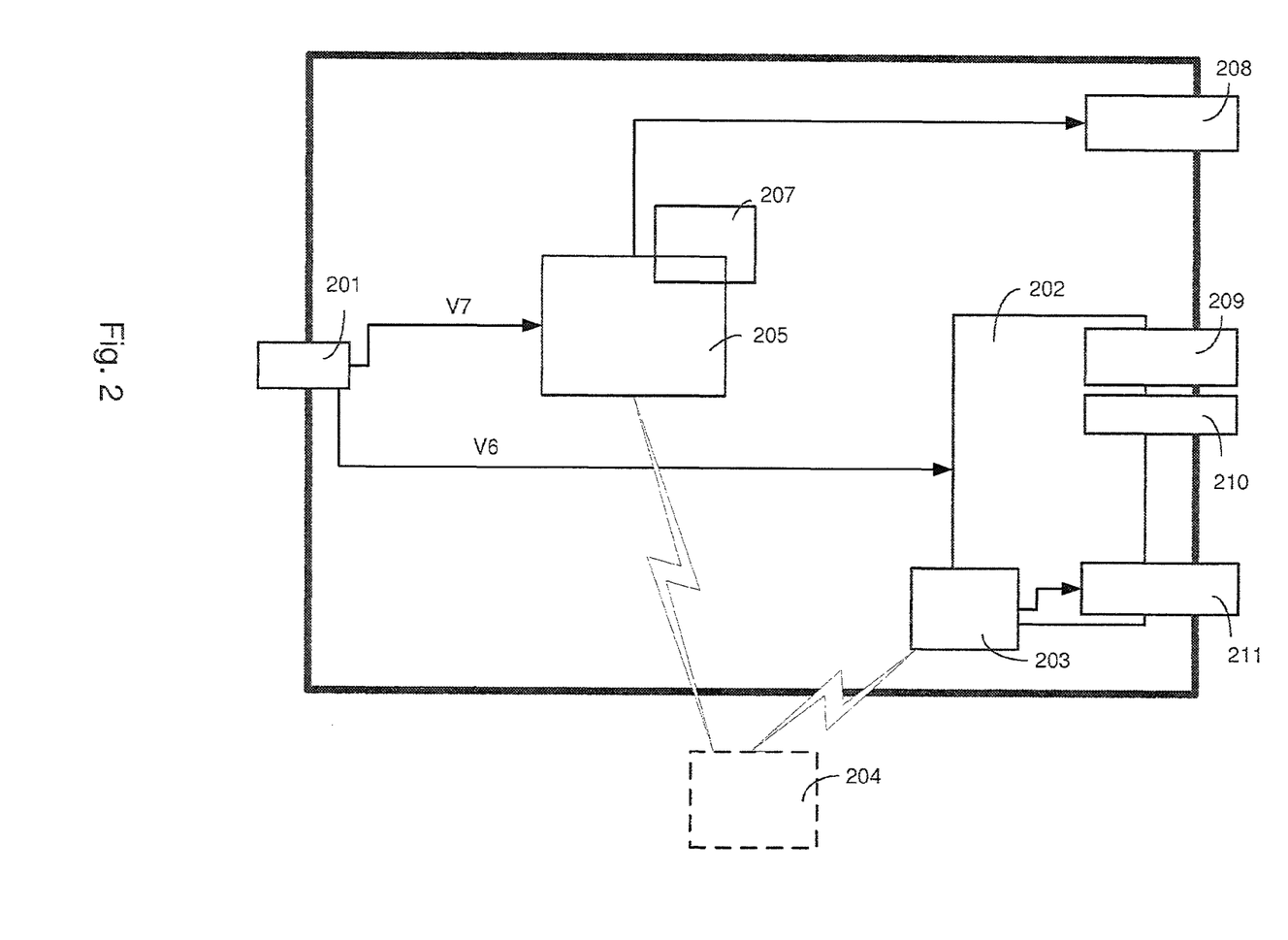
FIG. 2 is a block diagram of a data communication device according to a further embodiment of the present invention.

FIG. 2 shows a block diagram of a preferred data communication device according to an embodiment of the present invention. A supply voltage input (e.g. a voltage socket) 201 delivers a supply voltage V6 to a computation unit and data unit 202.

The computation unit and data unit 202 is, for instance, a navigation camera comprising a corresponding electronic system of an orthopedic navigation system. The computation unit and data unit 102 is connected to a first radio communication module 203 or comprises said module 203. By way of example, the first radio communication module 203 is a Bluetooth classic module as defined above. The first radio communication module 203 communicates by radio (in wireless manner) with an external radio device 204 which is for instance a computing/display unit for the camera data in the orthopedic navigation system. Said computing/display unit may be an ordinary PC having an installed or separate monitor, may be a tablet PC or any other unit which is at least capable of processing and/or displaying corresponding camera data. The external radio device 2Q4, however, may be any device which communicates with the first radio communication module 203 by radio. It may even be, for example, another orthopedic unit.

In addition, the data exchange between the first radio communication module 203 and the external radio device 204 may be of bidirectional nature, or may be designed such that nothing but data (for instance from the camera) is transmitted to the external radio device 204 for further processing. This, however, does not concern the possibly required bidirectional exchange of data or signals for establishing a connection between these two devices.

In addition, a second radio communication module 205 is supplied via the supply voltage input 201 with a supply voltage V7 which—depending on the demands on the part of the computation unit and data unit 202 and the second radio communication module 205—is the same as the supply voltage V6 or differs from it. The second radio communication module 205 is, for instance, a Bluetooth low-energy module as defined above. The second radio communication module comprises a memory 207 which is provided among other things in particular for storing identification data (e.g. the address) of the first radio communication module 203. The memory may be included in the second radio communication module 205 or separately provided so as to be able to communicate with the latter. The memory 207 may be an EEPROM, for example. By way of example, the memory 207 may also store further data, if need may be.

The second radio communication module 205 communicates with the external radio device 204 by radio (in wireless fashion) and sends to it, for instance, the identification data which are stored in the memory 207 and required by the external radio device 204 to be able to directly address the first radio communication module 203 in order to build up a communication connection to the latter.

As an option, the first radio communication module 205 is connected to a first display 208, for instance a light-emitting diode (LED) indicating a status of the first radio communication module, for instance the connection state. Further, the computation unit and data unit 202 is optionally connected to a second display 209 (for instance LED) and a third display 210 (for instance LED), wherein the second display 209 shows, for instance, if the computation unit and data unit 202 is supplied with the supply voltage V6, and wherein the third display 210 shows, for instance, if an error has occurred in the computation unit and data unit 202. In addition, the first radio communication module 203 is optionally connected to a fourth display 211 (for instance LED) which for instance shows the connection state of the connection to the external radio device 104.

Figure 1:
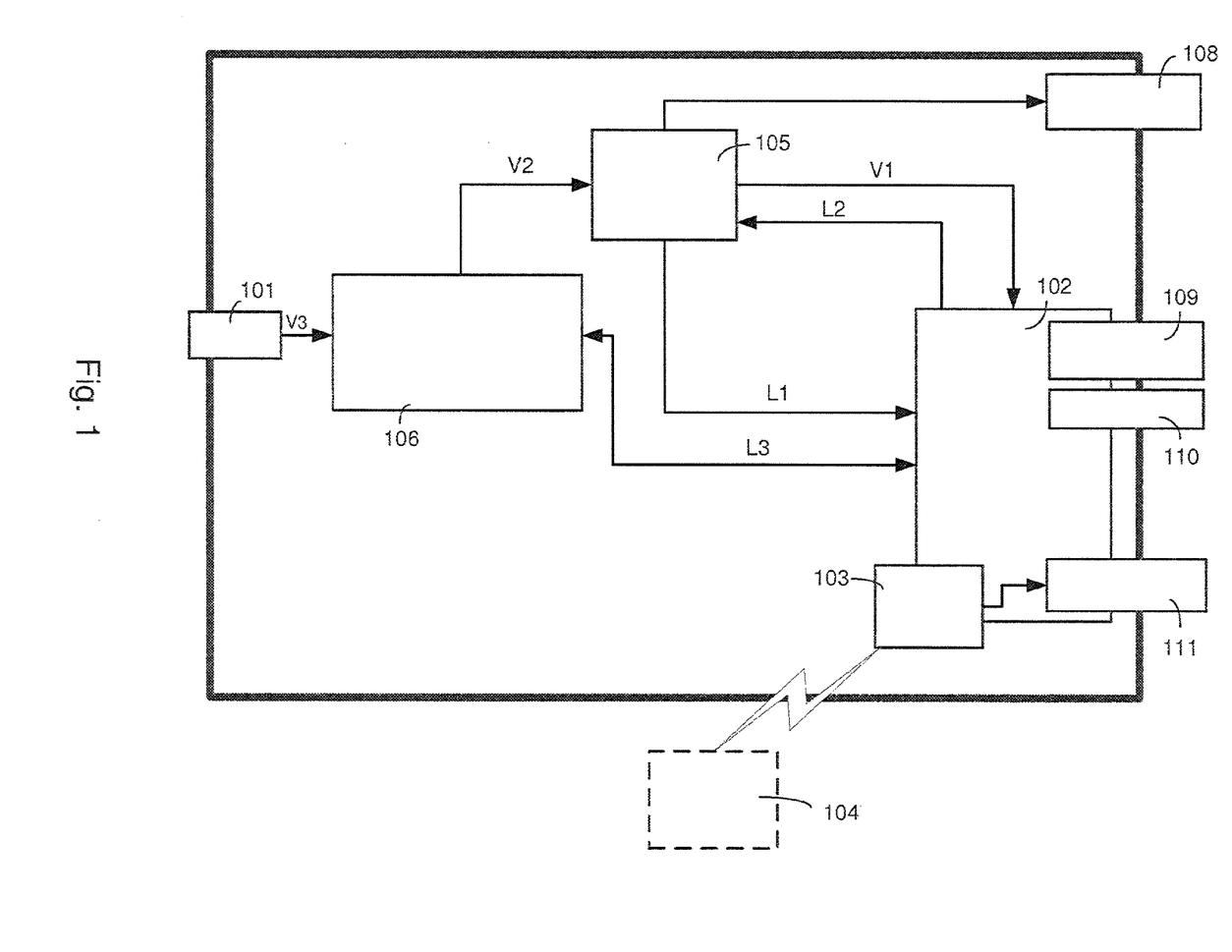
FIG. 1 is a block diagram of a data communication device according to an embodiment of the present invention.

FIG. 1 shows a block diagram of a data communication device according to a further embodiment of the present invention. A voltage V3 is supplied to a voltage supply unit 106 via a supply voltage input (for instance voltage socket) 101. The voltage supply unit 106 may comprise an accumulator which can be charged for instance via the supply voltage input 101 from an external point or from outside the data communication device. The voltage supply unit 106 outputs a voltage V2 to a switch-on unit 105. The switch-on unit 105 in turn outputs a supply voltage V1 to a computation unit and data unit 102. Moreover, the switch-on unit 105 is connected to the computation unit and data unit 102 via a signal line L1 through which the switch-on unit 105 outputs for instance a switch-on and switch-off signal to the computation unit and data unit 102 for switching on and off the computation unit and data unit 102. The computation unit and data unit 102 may in turn be able to deliver a system status to the switch-on unit 105 via a further signal line L2, with said status indicating for instance the ON or OFF state of the computation unit and data unit 102. Finally, the switch-on unit 105 is optionally coupled to a first display 108, for instance a light-emitting diode (LED) which indicates for instance the connection state of a second radio communication module 301 comprised in the switch-on unit 105.

The computation unit and data unit 102 is connected to the voltage supply unit 106 via a further signal line L3 through which the voltage supply unit 106 outputs for instance a state of charge of the accumulator 107 to the computation unit and data unit 102, and via which e.g. the computation unit and data unit 102 outputs signals, for instance control signals, to the voltage supply unit 106. Furthermore, the computation unit and data unit 102 is optionally coupled to a second display 109 (for instance LED) and a third display 110 (LED), wherein the second display 109 indicates for instance if the computation unit and data unit 102 is supplied with the supply voltage V1, and wherein the third display 110 shows, for instance, if an error has occurred in the computation unit and data unit 102.

The computation unit and data unit 102 is for instance a navigation camera comprising a corresponding electronic system of an orthopedic navigation system. The computation unit and data unit 102 is in turn connected to a first radio communication module 103 or comprises said module 103. By way of example, the first radio communication module 103 is a Bluetooth classic module as defined above. The first radio communication module 103 communicates by radio (in wireless manner) with an external radio device 104 which is for instance a computing/display unit for the camera data in the orthopedic navigation system. Said computing/display unit may be an ordinary PC having an installed or separate monitor, may be a tablet PC or any other unit which is at least capable of processing and/or displaying corresponding camera data. The external radio device 104, however, may be any device which communicates with the first radio communication module 103 by radio. It may even be, for example, another orthopedic unit.

In addition, the data exchange between the first radio communication module 103 and the external radio device 104 may be of bidirectional nature, or it may be designed such that nothing but data (for instance from the camera) is transmitted to the external radio device 104 for further processing. This, however, does not concern the possibly required bidirectional exchange of data or signals for establishing a connection between these two devices.

The first radio communication module 103 is further optionally coupled to a fourth display 111 (for instance LED) which shows, for instance, the connection state of the connection to the external radio device 104.

The voltage supply unit 106 may not only comprise an accumulator, as mentioned above, but also a charging device (charging electronics). The charging device may be supplied with the voltage V3 via the supply voltage input 101. The charging device 212 is able to charge the accumulator as needed by means of the delivered voltage V3 and to output the voltage V2 to the switch-on unit 105.

Figure 3:
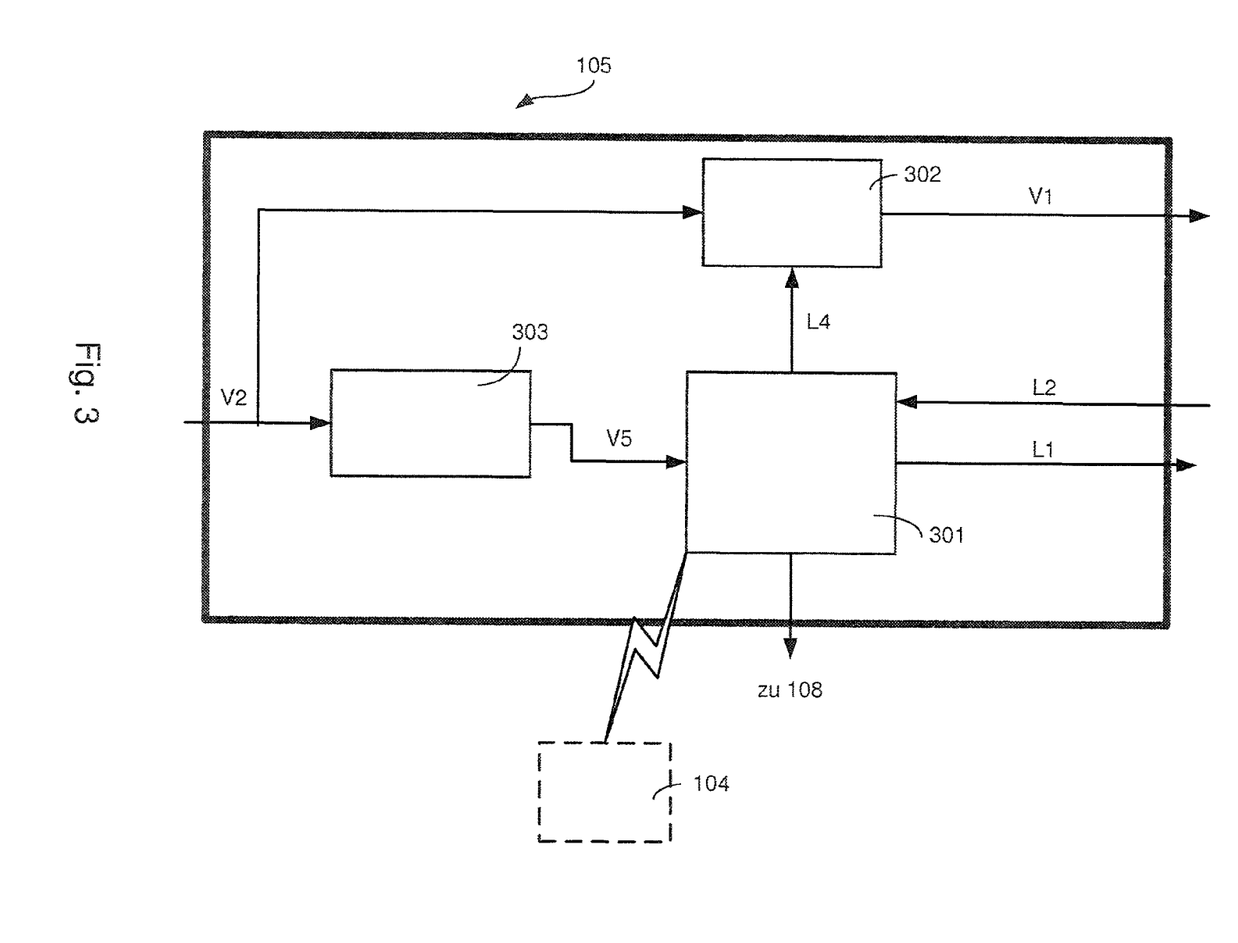
FIG. 3 is a block diagram of a switch-on unit according to the present invention.

FIG. 3 shows a switch-on unit 105 according to the invention, which comprises a second radio communication module 301 and a memory (not shown in the Figure) for storing the identification data of the first radio communication module 103 and which is used, for instance, in the data communication device of FIG. 1. The voltage V2 from the voltage supply unit 106 is supplied, on the one hand, to a voltage switching unit 302 and on the other hand possibly town optional voltage converter 303. The voltage switching unit 302 outputs the supply voltage V1 to the computation unit and data unit 102. The voltage converter 303 outputs a voltage V5 to the second radio communication module 301. If the voltage V2 already equals a voltage which is suitable for the second radio communication module 301, the voltage converter 303 is not required, so that the voltage V2 (equal to V5) is supplied to the second radio communication module 301 without a voltage converter connected therebetween.

The second radio communication module 301 is for instance a Bluetooth low-energy module as described above. The second radio communication module 301 is connected to the voltage switching unit 302 via a signal line L4, in order to output a signal to it which indicates if the voltage switching unit 302 is to deliver the supply voltage V1 to the computation unit and data unit 102 or if the provision of the supply voltage V1 is to be interrupted. Accordingly, the voltage switching unit 302 outputs the supply voltage V1 to the computation unit and data unit 102 only if the corresponding signal via the signal line L4 gives an instruction to do so. According to demand, the voltage switching unit 302 comprises a voltage converter which converts the voltage V2 delivered to the voltage switching unit 302 into a supply voltage V1 which is suitable for the computation unit and data unit 102.

The second radio communication module 301 communicates with the external radio device 104 by radio (in wireless manner) and sends to it, for instance, the identification data which are stored in the memory 207 and required by the external radio device 104 to be able to directly address the first radio communication module 103 in order to build up a communication connection to the latter.

Figure 4:
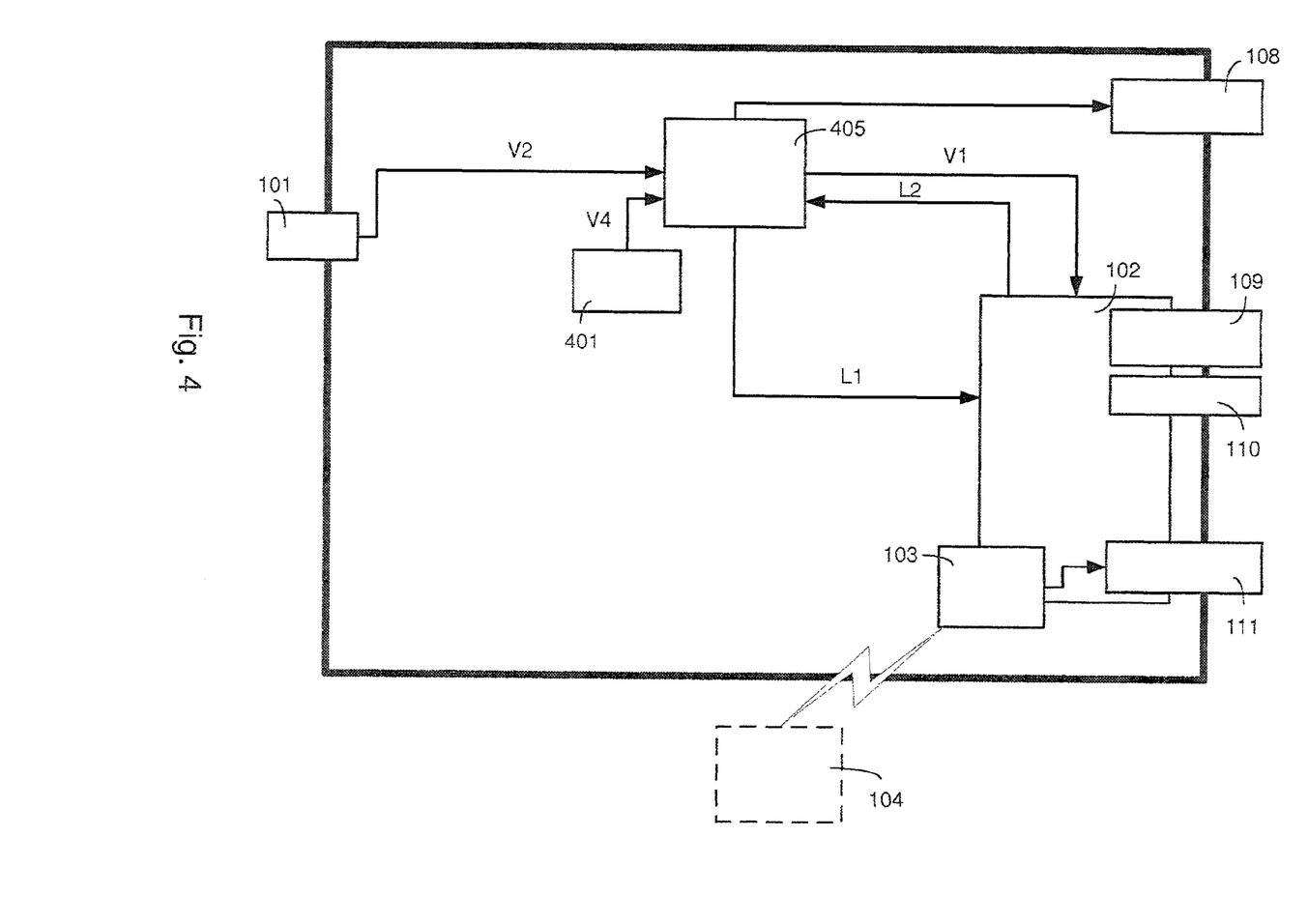
FIG. 4 is a block diagram of a data communication device according to still another embodiment of the present invention.

FIG. 4 shows a further embodiment of a data communication device according to the present invention. The same reference symbols are used for the same or comparable elements as in FIG. 1. The voltage V2 is supplied from the supply voltage input 101 to a switch-on unit 405 which, although not shown in the Figure, includes a second radio communication module comprising a memory. In addition, a battery 401 supplies the switch-on unit 405 with a voltage V4.

Figure 5:
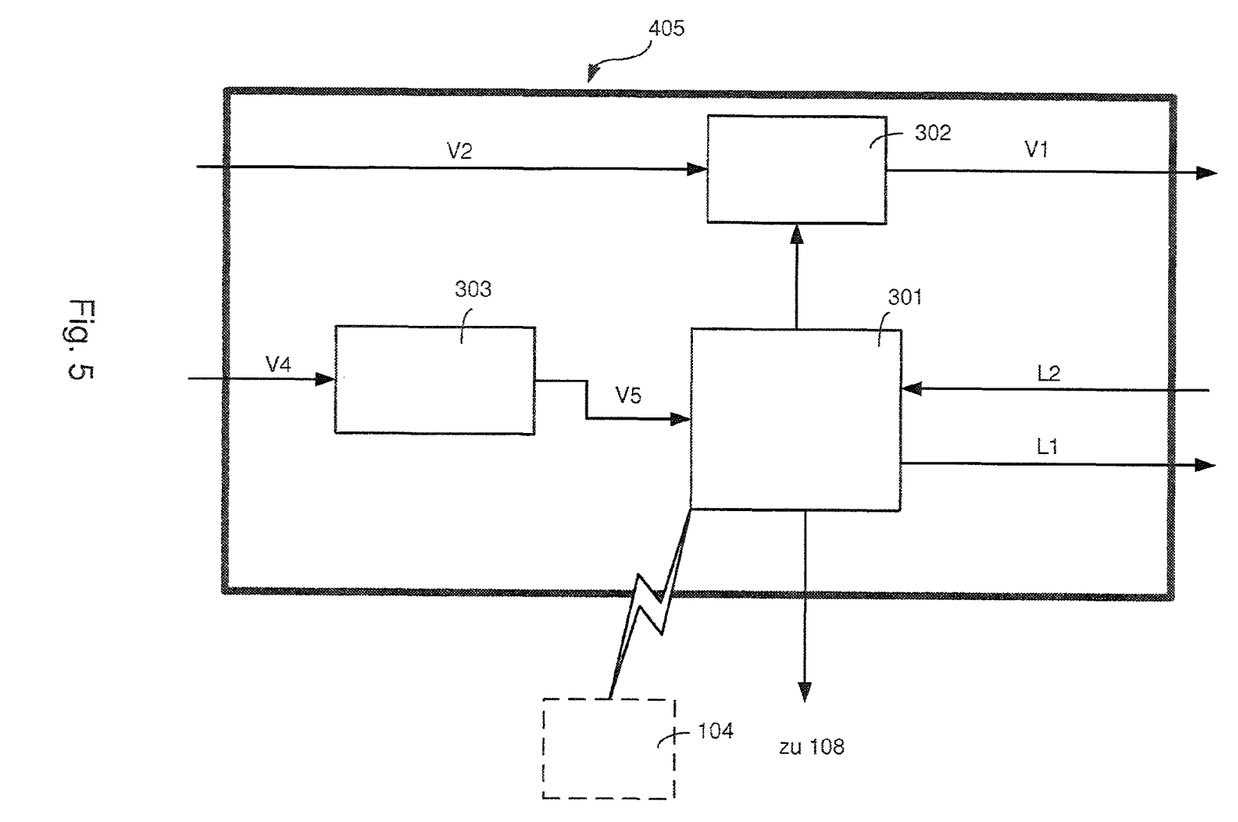
FIG. 5 shows a switch-on unit according to the present invention, which can be used in the data communication device of FIG. 4.

FIG. 5 shows the switch-on unit 405 which can be used in the data communication device of FIG. 4. Here, the battery voltage V4 is supplied from the battery 401 to the voltage converter 303 feeding the voltage V5 to the second radio communication module 301. The voltage V2 from the supply voltage input 101, however, is supplied to the voltage switching unit 302 which in turn outputs the supply voltage V1. In this arrangement, the battery 401 is responsible for the power supply of the second radio communication module 301 (for instance a BLE-module) which has only a low energy consumption, so that the energy delivered by the battery 401 is sufficient. In this case, the voltage V2 is provided via the supply voltage input 101 which is connected to an external voltage source in operation of the data communication device. Said external voltage source may also be an accumulator or a battery.

The operation of the data communication device according to the invention will be described below by way of example. The first radio communication module 103, 203 is operated, possibly following its activation by a power supply, in a receiving mode in which it is not detectable for the external radio device 104, 204, but upon receiving its identification data from the external radio device 104, 204 is ready for establishing a connection to it. On the contrary, the second radio communication module 205, 301 is operated in the standby mode in which it outputs for instance a signal in predetermined intervals which indicates that it is in operation, and in which it listens to other units regarding the fact whether these want to enter into a connection or communication with the second radio communication module 205, 301.

At the beginning, the external radio device 104, 204, receiving the "ready" signal from the second radio communication module 301 and selecting it for communication, outputs a corresponding signal to the second radio communication module 301 in order to build up a connection to the latter. Vice versa, it may also happen that the second radio communication module 205, 301, receiving a "ready" signal from the external radio device 104, 204 and selecting it for communication, outputs a corresponding signal to the external radio device 104, 204 in order to build up a connection to the latter. The external radio device 104, 204 and the second radio communication module 205, 301 will then enter into a communication connection, possibly after having run through an authorization process beforehand.

Subsequently, the second radio communication module 104, 204 reads, possibly upon request by the external radio device 104, 204, the identification data of the first radio communication module 103, 203 from the memory 207 and sends it to the external radio device 104, 204. Thereafter, the external radio device 104, 204 is capable of directly addressing the first radio communication module 103, 203 using the identification data (for instance the address) in order to enter into a communication connection to the first radio communication module 103, 203 and carry out a data exchange for instance with a high data rate.

As an alternative, the second radio communication module 301—after having built up the communication connection to the external radio device 104—may bring about that the computation unit and data unit 102 and possibly the first radio communication device 103 are actuated. This may be effected for instance in that the computation unit and data unit 102 is supplied with the supply voltage V1 by the switch-on unit 105, 405. Moreover, a final activation of the computation unit and data unit 102 may be achieved in that the second radio communication module 301 outputs a corresponding switch-on signal to the computation unit and data unit 102 via the signal line L1.

At the same time, e.g. the first radio communication module 103 is switched to the above receiving mode by providing the voltage supply. The external radio device 104 may direct a corresponding signal while using the identification data to the first radio communication module 103 together with the request of a connection establishment. The connection will then be established, possibly after having absolved a corresponding authorization process, so that the data exchange between the first radio communication module 103 and the external radio device 104 may then be performed.

If the data exchange is completed, the first radio communication module 103, 203 is switched for instance by the computation unit and data unit 102, 202 to an inactive state or the receiving mode, and the second radio communication module 301 changes to the standby mode. This may be effected in that the computation unit and data unit 102 outputs a corresponding signal to the second radio communication module 301 via the signal line L2.

Even after termination of the data exchange, the first radio communication module 103, 203 can be deactivated or switched to the receiving mode by a corresponding signal from the external radio device 104. The first radio communication module 103, 203 may further be able to enter into the inactive state or the receiving mode following a predetermined time period after it has not received any signal from the external radio device 104, 204 any more. If the first radio communication module 103 is not set to the inactive state or receiving mode by the computation unit and data unit 102, the computation unit and data unit 102 is yet able to monitor the state of the first radio communication module 103 and, if the latter is in the inactive state or receiving mode, switch the second radio communication module 301 to the standby mode, for instance by means of a corresponding signal via the signal line L2. On the other hand, also the external radio device 104, 204 whose data exchange with the first radio communication module 103, 203 is (or is supposed to be) completed or interrupted, may send a corresponding radio signal to the second radio communication module 205, 301, said signal causing the second radio communication module 205, 301 to change over to the standby mode. A further possibility is that the external radio device 104 sends a corresponding termination signal to the second radio communication module 301, which for the time being outputs a corresponding switch-off signal e.g. via the signal line L1 to the computation unit and data unit 102, and the computation unit and data unit 102 correspondingly deactivates the first radio communication module 103. Following the output of the switch-off signal, the second radio communication module 301 may then change to the standby mode, or for the time being it may wait for a confirmation signal from the computation unit and data unit 102, for instance via the signal line L2, indicating the deactivation of the first radio communication module 103, until it changes over to the standby mode.

Before the second radio communication module 301 changes to the standby mode, it may output a corresponding signal to the voltage switching unit 302 so that the latter stops the delivery of the supply voltage V1 to the computation unit and data unit 102. This may occur, for instance, after the expiration of a predetermined time period after having "powered down" the computation unit and data unit 102. This means that it has to be ensured, depending on which one of the units initiates the deactivation of the first radio communication module 103 and of the second radio communication module 301, that the interruption of the delivery of the supply voltage V1 to the computation unit and data unit 102 is only effected if the first radio communication module 103 has been deactivated or has completed its processes and if also the computation unit and data unit 102 has fully finished its processes, hence allowing for the interruption of the power supply.

Thus, if for instance a high transmission rate of the first radio communication module for the data transfer between the first radio communication module and the external radio device 104 is required and, in addition, there shall be safety with respect to attacks per DoS or undesired connections to other radio devices are to be avoided, it is advantageous to use a Bluetooth classic module (offering such a high data transmission rate) for the first radio communication module, and to use a Bluetooth low-energy module (which does not offer such a high data transmission rate but offers the safety against undesired connections, as it is not possible for the Bluetooth Classic module used for first radio communication module) for the second radio communication module.

The invention claimed is:

1. A data communication device, comprising:
a computation unit and data unit which comprises a first radio communication module for wireless data exchange with an external radio device or is connected to the first radio communication module,
a second radio communication module which communicates wirelessly with the external radio device, and
a memory that stores identification data of the first radio communication module, wherein
the first radio communication module is operated in a receiving mode in which it is not detectable by the external radio device, but upon receiving its identification data from the external radio device is ready to establish a connection and ready for a subsequent data exchange with the external radio device,
the second radio communication module is operated in a standby mode in which it waits for a communication query from the external radio device,
when the second radio communication module receives a communication query from the external radio device, the second radio communication module reads the identification data of the first radio communication module from the memory after the establishment of a radio communication connection to the external radio device and sends said identification data to the external radio device,
the data communication device further comprising:
a supply voltage input,
a switch-on unit which is coupled to the supply voltage input and comprises a voltage output connected to the computation unit and data unit, wherein
the switch-on unit comprises the second radio communication module,
when the second radio communication module receives a communication query from the external radio device, the second radio communication module causes the switch-on unit to deliver a supply voltage to the computation unit and data unit via the voltage output in order to activate the computation unit and data unit and to activate the first radio communication module and switch it to the receiving mode,
when the data exchange with the external radio device is completed, the second radio communication module changes to the standby mode.

2. The data communication device according to claim 1, wherein the first radio communication module is a Bluetooth-based communication module.

3. The data communication device according to claim 1, wherein the second radio communication module is a Bluetooth-based communication module.

4. The data communication device according to claim 1, wherein the second radio communication module establishes only one communication connection to an external radio device at a time.

5. The data communication device according to claim 1, wherein the first radio communication module has a higher data transmission rate and in the standby mode a higher energy consumption than the second radio communication module.

6. The data communication device according to claim 1, wherein
a voltage supply unit is connected between the supply voltage input and the switch-on unit, and
the voltage supply unit comprises a chargeable accumulator.

7. The data communication device according to claim 1, wherein, when the data exchange is completed, the second radio communication module causes the switch-on unit to interrupt the delivery of the supply voltage via the voltage output to the computation unit and data unit.

8. The data communication device according to claim 1, wherein the switch-on unit and the computation unit and data unit are connected to each other by a signal line via which the second radio communication module sends a switch-on signal to the computation unit and data unit for activating the computation unit and data unit after the expiration of a predetermined first time period upon feeding the supply voltage from the switch-on unit to the computation unit and data unit.

9. The data communication device according to claim 8, wherein the second radio communication module sends a switch-off signal via the signal line to the computation unit and data unit for deactivating the computation unit and data unit, before the switch-on unit, after the expiration of a predetermined second time period, interrupts the delivery of the supply voltage via the voltage output to the computation unit and data unit.

10. A method for data communication, comprising the steps of:
   A. operating a second radio communication module in a standby mode in which the second radio communication module waits for a communication query from a radio device,
   B. when the second radio communication module has received a communication query from the radio device:
      (i.) building up a radio communication connection between the second radio communication module and the radio device, and reading out identification data of the first radio communication module from a memory by the second radio communication module, and
      (ii.) sending the identification data from the second radio communication module to the radio device,
   C. operating a first radio communication module in a receiving mode in which it is not detectable by the radio device, but upon receiving its identification data from the radio device, is ready for establishing a connection and ready for a subsequent wireless data exchange with the radio device,
   D. when the second radio communication module receives a communication query from the external radio device, the second radio communication module brings about that a computation unit and data unit is fed with a supply voltage by a switch-on unit in order to activate the computation unit and data unit and to activate the first radio communication module and switch it to the receiving mode,
   E. building up a radio communication connection between the first radio communication module and the radio device and then exchanging data between the first radio communication module and the radio device, and
   F. when the data exchange is completed, switching the second radio communication module to the standby mode.

11. The method for data communication according to claim 10, wherein the first radio communication module communicates by means of Bluetooth technology.

12. The method for data communication according to claim 10, wherein the second radio communication module communicates by means of Bluetooth technology.

13. The method for data communication according to claim 10, wherein the second radio communication module establishes only one communication connection to a radio device at a time.

14. The method for data communication according to claim 10, wherein the first radio communication module has a higher data transmission rate and in the standby mode a higher energy consumption than the second radio communication module.

15. The method for data communication according to claim 10, wherein
   the switch-on unit is fed with an input voltage by a voltage supply unit, and
   the voltage supply unit comprises a chargeable accumulator.

16. The method for data communication according to claim 10, wherein, when the data exchange is completed, the second radio communication module brings about that the switch-on unit interrupts the delivery of the supply voltage to the computation unit and data unit.

17. The method for data communication according to claim 10, wherein a switch-on signal from the second radio communication module is sent to the computation unit and data unit for activating the computation unit and data unit after the expiration of a predetermined first time period upon feeding the supply voltage from the switch-on unit to the computation unit and data unit.

18. The method for data communication according to claim 17, wherein a switch-off signal from the second radio communication module is sent to the computation unit and data unit for deactivating the computation unit and data unit, before the delivery of the supply voltage from the switch-on unit to the computation unit and data unit is interrupted after the expiration of a predetermined second time period.

* * * * *